Feb. 28, 1928. 1,660,669
C. FROESCH
DRIVE FOR MOTOR VEHICLES
Filed May 15, 1926
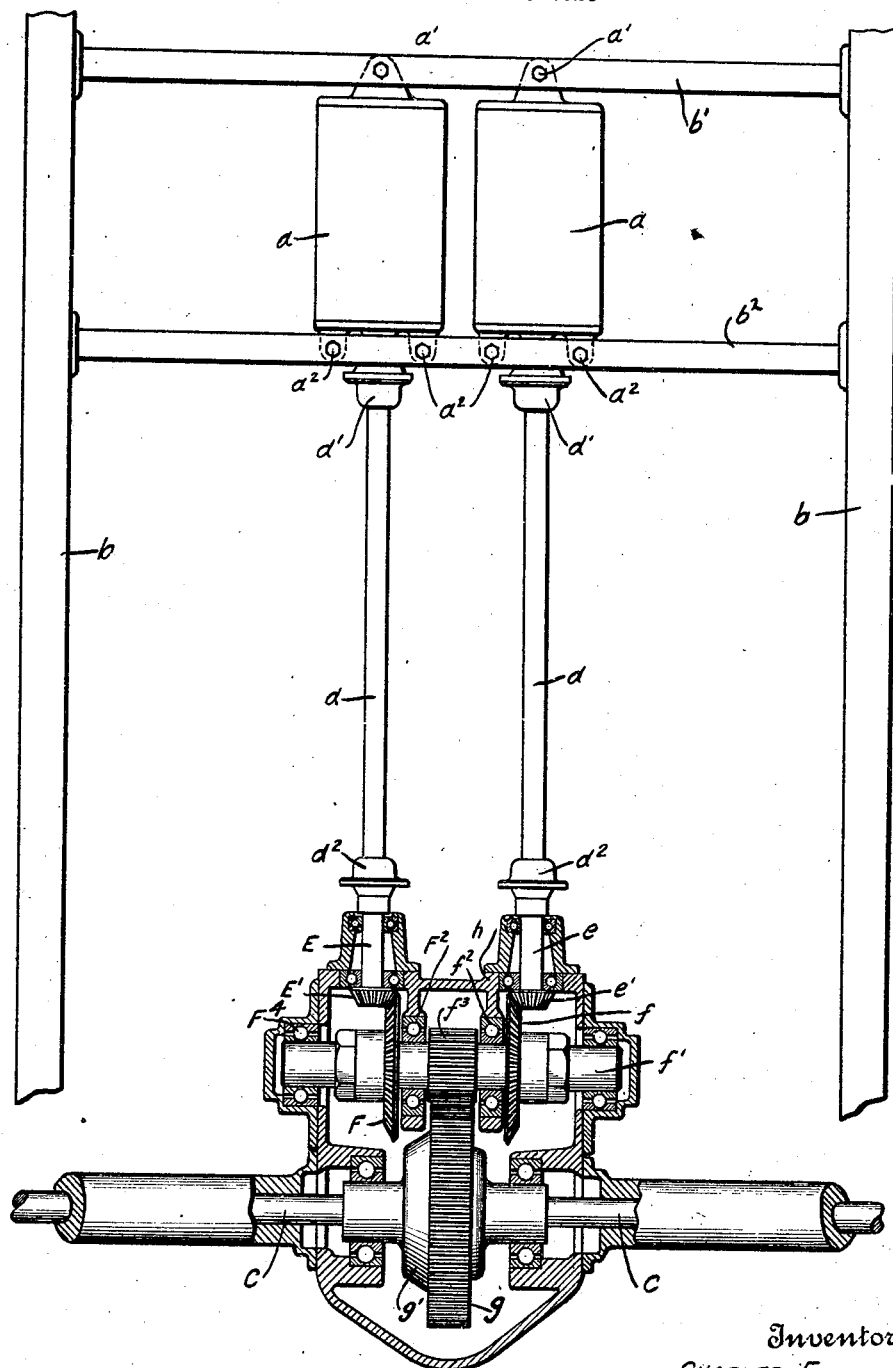
Inventor
CHARLES FROESCH
By his Attorneys
Redding, Greeley, O'Shea & Campbell Patented Feb. 28, 1928.

1,660,669

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

DRIVE FOR MOTOR VEHICLES.

Application filed May 15, 1926. Serial No. 109,240.

This invention relates to motor vehicles of the kind in which the drive is effected by electric motors receiving their current from internal combustion engine driven generators carried by the vehicle. More particularly, the invention relates to vehicles equipped with a pair of electric motors. Heretofore such vehicles have been provided with a double axle, one for each drive wheel, and each axle has been rotated by a separate motor. Differential or reduction gearing could not be availed of and a break-down of one of the motors resulted in propulsion through only one wheel. Furthermore, the construction necessitated the use of two relatively heavy gearing and axle housings thereby increasing materially the unsprung weight.

The present invention seeks to overcome the aforementioned disadvantages in a twin electric drive disposed within a single axle housing substantially the same size and weight as now found in standard drives used with internal combustion engines as the prime mover. Accordingly, two motors are disposed side by side centrally of the vehicle frame, from which vehicle propeller shafts extend rearwardly to drive, simultaneously the differential gearing at the rear axle.

The invention will now be described more fully with reference to the accompanying drawing, illustrating a preferred embodiment thereof, in which a twin electric motor drive according to the present invention is shown in plan, with parts removed in the interest of clearness.

The two electric motors $a$, $a$, are mounted close together, near the longitudinal median line of the frame $b$, where they are out of the way of the water, dirt or mud thrown up by the rotating wheels. Preferably, each is independently carried by a three point support, $a'$, and $a^2$, $a^2$, from the transverse frame members $b'$, $b^2$, respectively. Neither the electric conductors leading to the motors, nor the generators nor engine are illustrated as these form no part of the invention.

The driving force is transmitted rearwardly from each motor $a$ to the rear axle (composed of the live axle sections $c$, $c$,) by means of a propeller shaft $d$ connected by a flexible coupling or universal joint $d'$ with the rotor shaft of the motor and universal joint $d^2$ with a stub shaft $e$ or E carrying a bevel pinion $e'$ or E′ meshing with a bevel gear $f$ or F carried on the transverse shaft $f'$. The two gears $f$, F are carried in what might be called a back to back manner whereby the driving thrusts are balanced or opposed and a simple type of bearing $f^2$ is enabled to be used. Between the bearings $f^2$, F², is disposed the gear $f^3$ which meshes with the ring gear $g$ of the differential gearing $g'$ driving the axle shafts. The differential is thus driven from the gear $f^3$ carried on shaft $f'$ and this shaft is turned from either one of the motors so that if one motor is disabled, both wheels will be driven from the other motor.

The present construction affords a considerable decrease in the unsprung weight of the drive over previously proposed twin motor drives since only one housing $h$ is required which is practically no larger than the usual housing for a double reduction rear end drive in internal combustion engine driven vehicles, the additional weight being represented only by the sets of bearings F² and F⁴, the gear F and the shaft E, pinion E′ and the bearings therefor.

Various modifications may be made in the disposition and configuration of the component elements of the driving axle and its associated parts without departing from the spirit and scope of the invention as set out in the appended claim.

What I claim is:

In a drive for motor vehicles, in combination, a pair of electric motors disposed adjacent one another on opposite sides of the longitudinal median line of the vehicle, live axle sections, differential gearing connected with the axle sections, a pair of propeller shafts rotated by the motors, respectively, and extending longitudinally of the vehicle, a housing for the differential gearing having a housing for dual reduction gearing formed therewith forwardly of the live axle sections, short shaft sections journaled in said housing and connected to said propeller shafts through universal joints, bevel pinions carried with said short shaft sections, a jack shaft journaled in said housing and disposed parallel to the live axle sections and perpendicular to the propeller shafts, bevel gears carried with said jack shaft and meshing with said bevel pinions, and a gear carried with said jack shaft intermediate said bevel gears and meshing with the differential ring gear.

This specification signed this 5th day of May, A. D. 1926.

CHARLES FROESCH.